US011687718B2

(12) United States Patent
Pang et al.

(10) Patent No.: US 11,687,718 B2
(45) Date of Patent: Jun. 27, 2023

(54) METHOD, APPARATUS, DEVICE, AND STORAGE MEDIUM FOR LEARNING KNOWLEDGE REPRESENTATION

(71) Applicant: BEIJING BAIDU NETCOM SCIENCE AND TECHNOLOGY CO., LTD., Beijing (CN)

(72) Inventors: Chao Pang, Beijing (CN); Shuohuan Wang, Beijing (CN); Yu Sun, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 146 days.

(21) Appl. No.: 17/116,846

(22) Filed: Dec. 9, 2020

(65) Prior Publication Data
US 2021/0390257 A1 Dec. 16, 2021

(30) Foreign Application Priority Data
Jun. 12, 2020 (CN) .......................... 202010532558.X

(51) Int. Cl.
*G06F 17/00* (2019.01)
*G06F 40/295* (2020.01)
*G06F 40/137* (2020.01)
*G06F 40/30* (2020.01)

(52) U.S. Cl.
CPC .......... *G06F 40/295* (2020.01); *G06F 40/137* (2020.01); *G06F 40/30* (2020.01)

(58) Field of Classification Search
None
See application file for complete search history.

(56) References Cited

U.S. PATENT DOCUMENTS 11,341,366 B2 * 5/2022 Niu .......................... G06F 40/30

FOREIGN PATENT DOCUMENTS

| CN | 109033135 | 12/2018 |
| CN | 209033135 | 12/2018 |
| CN | 109918506 | 6/2019 |

(Continued)

OTHER PUBLICATIONS

Jure Leskovec et al. "Sampling from Large Graphs", Aug. 20, 2006, Proceedings of the Twelfth ACM SIGKDD International Conference on Knowledge Discovery and Data Mining, Section 3.3.1 and 3.3.3 (Year: 2006).*

(Continued)

*Primary Examiner* — Satwant K Singh
(74) *Attorney, Agent, or Firm* — Knobbe, Martens, Olson & Bear, LLP

(57) ABSTRACT

A method, an apparatus, a device and a storage medium for learning a knowledge representation are provided. The method can include: sampling a sub-graph of a knowledge graph from a knowledge base; serializing the sub-graph of the knowledge graph to obtain a serialized text; and reading using a pre-trained language model the serialized text in an order in the sub-graph of the knowledge graph, to perform learning to obtain a knowledge representation of each word in the serialized text. The knowledge representation learning in this embodiment is performed for entity and relationship representation learning in the knowledge base.

15 Claims, 5 Drawing Sheets

(56) References Cited

FOREIGN PATENT DOCUMENTS

| | | |
|---|---|---|
| CN | 110059320 | 7/2019 |
| CN | 110196894 | 9/2019 |
| CN | 110263324 | 9/2019 |
| JP | 2016 029561 | 3/2016 |
| JP | 2018-067199 | 4/2018 |
| KR | 20180092194 A | 8/2018 |
| KR | 20190058636 A | 5/2019 |

OTHER PUBLICATIONS

Jaiwei Zhang et al. "Graph-BERT: Only Attention is Needed for Learning Graph Representations", Jan. 15, 2020, ARXIV, Org, Cornell University Library, Figure 1, Sections 3.1-3.3 (Year: 2020).*
European Search Report received in European Application No. EP21162391 as dated Oct. 2, 2022 in 8 pages.
Leskovec, Jure et al., "Sampling from Large Graphs," Proceedings of the Twelfth ACM SIGKDD International Conference on Knowledge Discovery and Data Mining, Aug. 20, 2006, pp. 631-636, ACM Press, New York, NY, USA.
Liu, Weijie et al., "K-BERT: Enabling Language Representation with Knowledge Graph", ARXIV.org, Sep. 17, 2019, Cornell University Library, Ithaca, NY, USA.
Zhang, Jiawei et al., "Graph-Bert: Only Attention is Needed for Learning Graph Representations," ARXIV.org, Jan. 15, 2020. Cornell University Library, Ithaca, NY, USA.
Japanese Office Action dated Mar. 1, 2022 for Japanese Patent Application No. 2020-201660.

* cited by examiner

METHOD, APPARATUS, DEVICE, AND STORAGE MEDIUM FOR LEARNING KNOWLEDGE REPRESENTATION

CROSS-REFERENCE TO RELATED APPLICATIONS

This application claims the priority to Chinese Patent Application No. 202010532558.X, titled "METHOD, APPARATUS, DEVICE, AND STORAGE MEDIUM FOR LEARNING KNOWLEDGE REPRESENTATION," filed on Jun. 12, 2020, which is incorporated herein by reference in its entirety.

TECHNICAL FIELD

Embodiments of the present disclosure relate to the field of computer technology, specifically to the technical fields of natural language processing, deep learning, and knowledge graph, and more specifically to a method, apparatus, device, and storage medium for learning a knowledge representation.

BACKGROUND

Knowledge base may refer to a database that orderly stores related data. Generally, the knowledge base may be represented in the form of a network, with nodes representing entities and connecting edges representing relationships between entities. In the network form, it is usually necessary to design a specialized knowledge graph to calculate, store and use the knowledge base. Designing a knowledge graph not only has the disadvantage of time-consuming and labor-intensive, but also suffers from the problem of data sparseness. Therefore, representation learning technology represented by deep learning has received widespread attention. Representation learning aims to identify semantic information of a research object as a dense low-dimensional real-value vector.

At present, inspired by the phenomenon of translation invariance in the word vector space, the TransE model is proposed, which regards a relationship in the knowledge base as a certain translation vector between entities. For each triple (h, r, t), the TransE model uses the vector $l_r$ of the relation r as the translation between the head entity vector $l_h$ and the tail entity vector $l_t$. The TransE model obtains effective representations of relationships and entities by letting $l_h + l_r \approx l_t$.

SUMMARY

Embodiments of the present disclosure propose a method, apparatus, device, and storage medium for learning a knowledge representation.

In a first aspect, embodiments of the disclosure provides a method for learning a knowledge representation. The method includes: sampling a sub-graph of a knowledge graph from a knowledge base; serializing the sub-graph of the knowledge graph to obtain a serialized text; and reading, using a pre-trained language model, the serialized text in an order in the sub-graph of the knowledge graph, to perform learning to obtain a knowledge representation of each word in the serialized text.

In a second aspect, embodiments of the disclosure provides an apparatus for learning a knowledge representation. The apparatus includes a sampling module, configured to sample a sub-graph of a knowledge graph from a knowledge base; a serialization module, configured to serialize the sub-graph of the knowledge graph to obtain a serialized text; and a learning module, configured to read, using a pre-trained language model, the serialized text in an order in the sub-graph of the knowledge graph, to perform learning to obtain a knowledge representation of each word in the serialized text.

In a third aspect, embodiments of the disclosure provides an electronic device for learning a knowledge representation. The electronic device includes one or more processors; and a storage storing instructions executable by at least one processor, where the instructions, when executed by the one or more processors, cause the at least one processor to implement the method according to any embodiment of the first aspect.

In a fourth aspect, embodiments of the disclosure provides a non-transitory computer readable storage medium storing computer instructions. The instructions is used to cause a computer to perform the method according to any embodiment of the first aspect.

According to the method, apparatus, device, and storage medium for learning a knowledge representation provided by the embodiments of the present disclosure, first the sub-graph of the knowledge graph is sampled from the knowledge base; then the sub-graph of the knowledge graph is serialized to obtain the serialized text; and finally the serialized text is read using the pre-trained language model in the order in the sub-graph of the knowledge graph, to perform learning to obtain the knowledge representation of each word in the serialized text. The knowledge representation learning is performing for entity and relationship representation learning in the knowledge base, which can efficiently calculate the semantic association of entities and relationships in a low-dimensional space, effectively solve the problem of data sparseness, and significantly improve the performance of knowledge acquisition, fusion and reasoning. In addition, using a powerful knowledge acquisition capability and context analysis capability of the pre-trained language model, the knowledge representation learned by the pre-trained language model may better represent complex relationships in the knowledge base.

It should be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

By reading the detailed description of non-limiting embodiments with reference to the following accompanying drawings, other features, objectives and advantages of the present disclosure will become more apparent. The accompanying drawings are used to better understand the present solution and do not constitute a limitation to the present disclosure, in which.

DETAILED DESCRIPTION OF EMBODIMENTS

The following describes example embodiments of the present disclosure with reference to the accompanying drawings, which include various details of the embodiments of the present disclosure to facilitate understanding, and should be regarded merely as examples. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
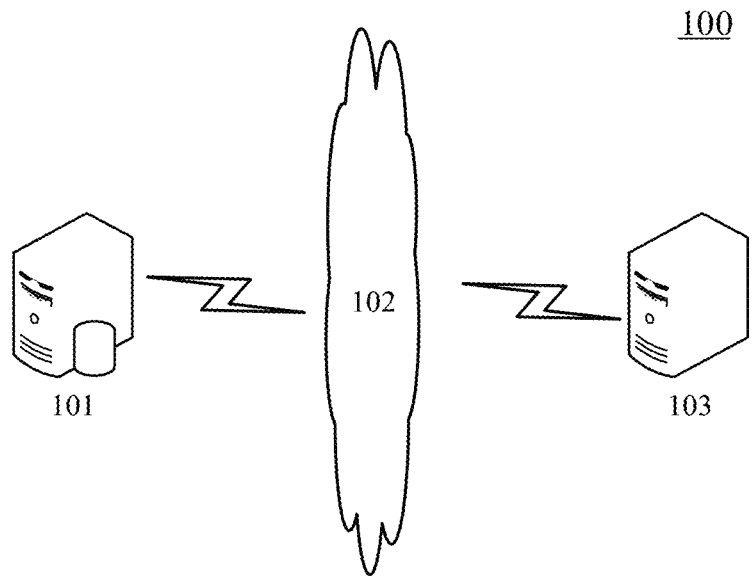
FIG. 1 is a diagram of an example system architecture in which some embodiments of the present disclosure may be implemented.

FIG. 1 illustrates an example system architecture 100 of an embodiment of a method for learning a knowledge representation or an apparatus for learning a knowledge representation in which the present disclosure may be implemented.

As shown in FIG. 1, the system architecture 100 may include a database 101, a network 102, and a server 103. The network 102 is used to provide a communication link medium between the database 101 and the server 103. The network 102 may include various types of connections, such as wired, wireless communication links, or optic fibers.

The database 101 may be used to store a knowledge base.

The server 103 may provide various services. For example, the server 103 may perform processing such as analysis on the knowledge base and other data acquired from the database 101 to generate a processing result (for example, a knowledge representation).

It should be noted that the server 103 may be hardware or software. When the server 103 is hardware, it may be implemented as a distributed server cluster composed of a plurality of servers, or as a single server. When the server 103 is software, it may be implemented as a plurality of software pieces or software modules (for example, for providing distributed services) or as a single software or software module, which is not specifically limited herein.

It should be noted that the method for learning a knowledge representation provided by the embodiments of the present disclosure is generally performed by the server 103. Accordingly, the apparatus for learning a knowledge representation is generally disposed in the server 103.

It should be understood that the number of databases, networks and servers in FIG. 1 is merely illustrative. Depending on the implementation needs, there may be any number of databases, networks and servers. In the case where a knowledge base is stored in the server 103, the system architecture 100 may not provide the database 101 and the network 102.

Figure 2:
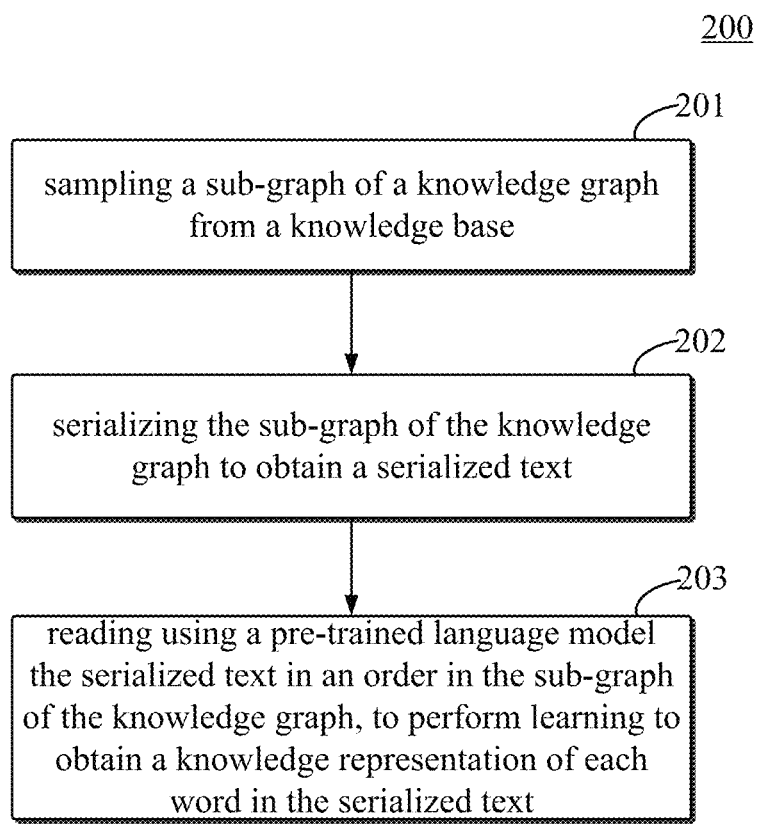
FIG. 2 is a flowchart of an embodiment of a method for learning a knowledge representation according to some embodiments of the present disclosure.

With further reference to FIG. 2, a flow 200 of an embodiment of a method for learning a knowledge representation according to the present disclosure is illustrated. The method for learning a knowledge representation includes the following steps 201 to 203.

Step 201 includes sampling a sub-graph of a knowledge graph from a knowledge base.

In the present embodiment, an executing body of the method for learning a knowledge representation (for example, the server 103 shown in FIG. 1) may sample a large number of sub-graphs of the knowledge graph from the knowledge base.

The knowledge base may refer to a database that orderly stores related data. Generally, the knowledge base may be represented in the form of a network, with nodes representing entities and connecting edges representing relationships between entities. The large-scale knowledge base may also be called a knowledge graph, and the basic composition of the knowledge graph is a triplet, including two entities of subject and object, and the relationship between the two entities.

Generally, the executing body may sample the sub-graph of the knowledge graph from the knowledge base according to a certain sampling strategy. Specifically, the executing body may sample some nodes that have relationship with each other in the knowledge base, and the entities represented by these nodes and the relationship between each other may form the sub-graph of the knowledge graph.

Step 202 includes serializing the sub-graph of the knowledge graph to obtain a serialized text.

In the present embodiment, the executing body may serialize the sub-graph of the knowledge graph to obtain the serialized text. The serialized text may be composed of entities and relationships in the sub-graph of the knowledge graph based on a certain order and a strategy.

Step 203 includes reading using a pre-trained language model the serialized text in an order in the sub-graph of the knowledge graph, to perform learning to obtain a knowledge representation of each word in the serialized text.

In the present embodiment, the executing body may read the serialized text using the pre-trained language model in the order in the sub-graph of the knowledge graph, to perform learning to obtain the knowledge representation of each word in the serialized text.

Here, the training process of the pre-trained language model may include a pre-training phase and a fine-tuning phase. In the pre-training phase, a large amount of unsupervised corpus is used for pre-training the language model. In the fine-tuning stage, a small amount of labeled corpus is used for fine-tuning to complete specific natural language processing (NLP) tasks. Here, using the serialized text to train the pre-trained language model belongs to the pre-training phase.

In the field of NLP, the pre-trained language model shows excellent results on a plurality of NLP tasks. In addition, the pre-trained language model performs well on tasks that require real-world description and knowledge reasoning, such as many reading comprehension tasks and information extraction tasks. This shows that the pre-trained model has a good knowledge acquisition capability and can be used to better learn knowledge representations. Alternatively, the pre-trained language model may be BERT (Bidirectional Encoder Representation from Transformers). BERT is a deep two-way representation pre-trained model, which can more deeply extract semantic information of text.

The pre-trained language model reads the serialized text in the order in the sub-graph of the knowledge graph, and can determine a context relationship of each word in the serialized text, so that the learned knowledge representation of each word can be combined with its context information, and can better express complex relationship in the knowledge base. In order to enable the pre-trained language model to read the serialized text in the order in the sub-graph of the knowledge graph, the executing body may generate a mask matrix corresponding to the serialized text based on the serialized text and the sub-graph of the knowledge graph. The mask matrix corresponding to the serialized text may express that each word in the serialized text may acquire the situation of the word from the serialized text. In addition, in order to further express structure information contained in the sub-graph of the knowledge graph, the executing body may further generate a hierarchical code corresponding to the serialized text based on the serialized text and the sub-graph of the knowledge graph. The hierarchical code corresponding to the serialized text may express a hierarchical order of words of the serialized text in the sub-graph of the knowledge graph. The pre-trained language model reads the serialized text based on the mask matrix and the hierarchical code corresponding to the serialized text, that is, the model may read the serialized text in the order in the sub-graph of the knowledge graph, to obtain the knowledge representation of each word in the serialized text by learning.

The method for learning a knowledge representation provided by the embodiment of the present disclosure, first samples the sub-graph of the knowledge graph from the knowledge base; then serializes the sub-graph of the knowledge graph to obtain the serialized text; and finally reads the serialized text using the pre-trained language model in the order in the sub-graph of the knowledge graph, to perform learning to obtain the knowledge representation of each word in the serialized text. The knowledge representation learning is learning for entity and relationship representation in the knowledge base, which can efficiently calculate the semantic association of entities and relationships in a low-dimensional space, effectively solve the problem of data sparseness, and significantly improve the performance of knowledge acquisition, fusion and reasoning. In addition, using a powerful knowledge acquisition capability and context analysis capability of the pre-trained language model, the knowledge representation learned by the pre-trained language model may better represent complex relationships in the knowledge base.

Figure 3:
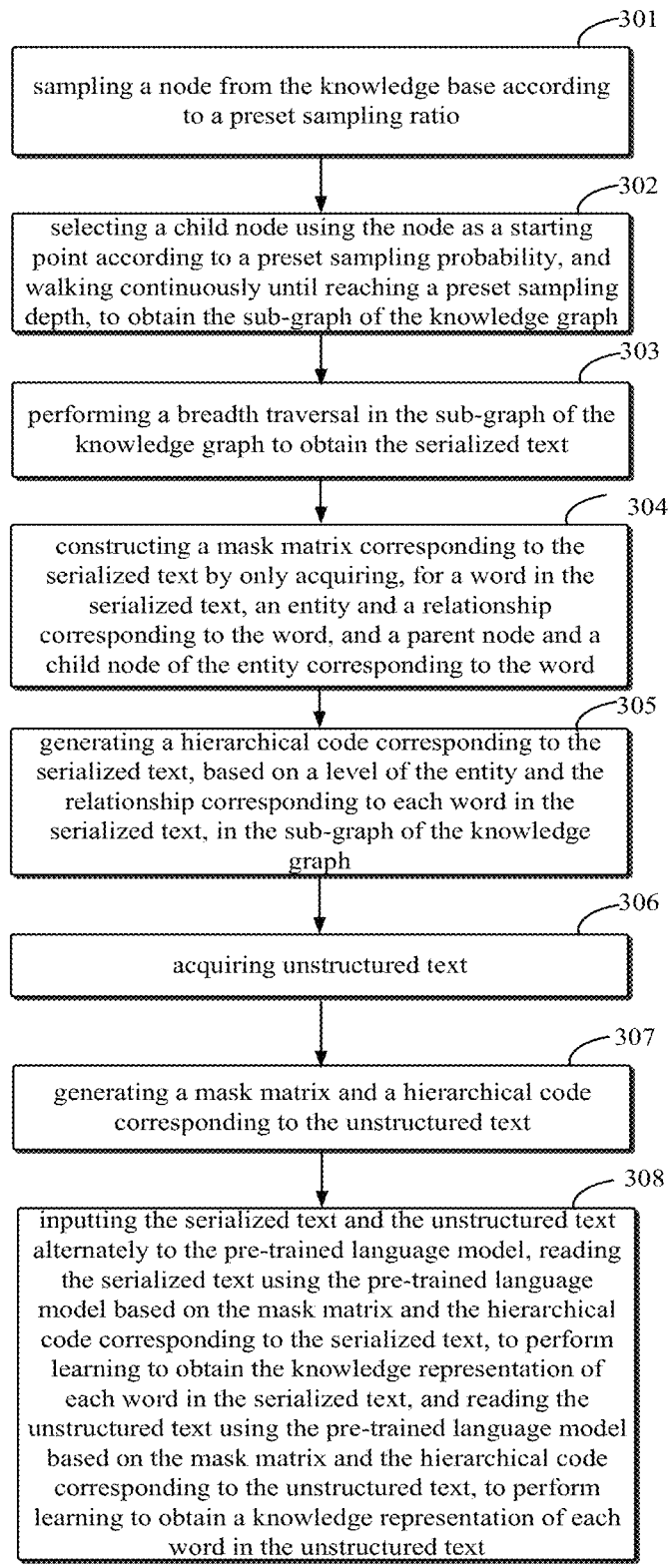
FIG. 3 is a flowchart of another embodiment of the method for learning a knowledge representation according to some embodiments of the present disclosure.

With further reference to FIG. 3, a flow 300 of another embodiment of the method for learning a knowledge representation according to the present disclosure is illustrated. The method for learning a knowledge representation includes the following steps 301 to 308.

Step 301 includes sampling a node from the knowledge base according to a preset sampling ratio.

In the present embodiment, the executing body of the method for learning a knowledge representation (for example, the server 103 shown in FIG. 1) may sample the node from the knowledge base according to the preset sampling ratio. The sampling method may include but is not limited to random sampling. The sampling ratio may be preset as required, such as 0.2.

Step 302 includes selecting a child node using the node as a starting point according to a preset sampling probability, and walking continuously until reaching a preset sampling depth, to obtain the sub-graph of the knowledge graph.

In the present embodiment, for each sampled node, the executing body may select the child node using the node as the starting point according to the preset sampling probability, and walk continuously until reaching the preset sampling depth, to obtain the sub-graph of the knowledge graph corresponding to the node. The walking method may include but is not limited to random walking. The sampling probability and the sampling depth may be preset as required, for example, the sampling probability may be 0.5, and the sampling depth may be 3, for example.

It should be noted that sampling a node may correspond to obtaining a sub-graph of the knowledge graph, and sampling enough nodes may obtain enough sub-graphs of the knowledge graph.

Step 303 includes performing a breadth traversal in the sub-graph of the knowledge graph to obtain the serialized text.

In the present embodiment, the executing body may perform the breadth traversal in the sub-graph of the knowledge graph to obtain the serialized text.

Step 304 includes constructing a mask matrix corresponding to the serialized text by only acquiring, for a word in the serialized text, an entity and a relationship corresponding to the word, and a parent node and a child node of the entity corresponding to the word.

In the present embodiment, the executing body may generate the mask matrix corresponding to the serialized text based on the serialized text and the sub-graph of the knowledge graph. Specifically, the executing body may construct the mask matrix corresponding to the serialized text by only acquiring, for each word in the serialized text, the entity and the relationship corresponding to the word, and the parent node and the child node of the entity corresponding to the word. That is, the serialized text includes a plurality of words, and using any word in the serialized text as an example, for this word only the entity and the relationship corresponding to the word itself, and the parent node and the child node of the entity corresponding to the word itself are acquired.

The mask matrix corresponding to the serialized text may represent that for each word in the serialized text, words can be acquired from the serialized text. The mask matrix is a symmetric matrix in which each of the number of rows and the number of columns equal to the number of words in the serialized text. The rows and columns of the mask matrix correspond to the words in the corresponding serialized text in one-to-one correspondence. For each row in the mask matrix, a word corresponding to an element with a value of 1 can be acquired by the word corresponding to this row, and a word corresponding to an element with a value of 0 can not be acquired by the word corresponding to this row.

Generally, each word in the serialized text may acquire the entity and the relationship corresponding to the word. In addition, in order to express connection information between the nodes in the sub-graph of the knowledge graph, each word in the serialized text may also acquire the parent node and the child node of the entity corresponding to the word. It can be seen that in the row corresponding to each word, values of elements corresponding to the entity and the relationship corresponding to the word, and values of elements corresponding to the parent node and the child node of the entity corresponding to the word are all 1, and values of the remaining elements are all 0.

Step 305 includes generating a hierarchical code corresponding to the serialized text, based on a level of the entity and the relationship corresponding to each word in the serialized text, in the sub-graph of the knowledge graph.

In the present embodiment, the executing body may generate the hierarchical code corresponding to the serialized text, based on the serialized text and the sub-graph of the knowledge graph. Specifically, the executing body may generate the hierarchical code corresponding to the serialized text, based on the hierarchy of the entity and the relationship corresponding to each word in the serialized text in the sub-graph of the knowledge graph.

The hierarchical code corresponding to the serialized text may assign a corresponding digital code in sequence according to a hierarchical order of words in the serialized text in the sub-graph of the knowledge graph. The hierarchical codes of words corresponding to a root node are all 1, and the hierarchical codes of a word corresponding to a child node of the root node, and a word corresponding to the relationship between the root node and the child node are all 2, and so on. It should be understood that the relationship and its corresponding tail node correspond to the same hierarchical code.

Step 306 includes acquiring unstructured text.

In the present embodiment, the executing body may acquire the unstructured text. There is no relationship between words in the unstructured text.

Step 307 include generating a mask matrix and a hierarchical code corresponding to the unstructured text.

In the present embodiment, the executing body may generate the mask matrix and the hierarchical code corresponding to the unstructured text.

The mask matrix corresponding to the unstructured text is the same as an original pre-trained model, which is an all-one matrix in which each of the number of rows and the number of columns equal to the number of words in the unstructured text. The rows and the columns of the mask matrix correspond to the words in the corresponding unstructured text in one-to-one correspondence. For each row in the mask matrix, a word corresponding to the element of value 1 can be acquired by the word corresponding to the row, and a word corresponding to the element of value 0 can not be acquired by the word corresponding to the row. Since the mask matrix corresponding to the unstructured text is an all-one matrix, each word in the unstructured text may acquire all the words in the unstructured text.

The hierarchical code corresponding to the unstructured text may assign a corresponding digital code in sequence according to a hierarchical order of words in the unstructured text. Since the unstructured text is a single hierarchy, the corresponding hierarchical codes are all 0.

Step 308 includes inputting the serialized text and the unstructured text alternately to the pre-trained language model, reading the serialized text using the pre-trained language model based on the mask matrix and the hierarchical code corresponding to the serialized text, to perform learning to obtain the knowledge representation of each word in the serialized text, and reading the unstructured text using the pre-trained language model based on the mask matrix and the hierarchical code corresponding to the unstructured text, to perform learning to obtain a knowledge representation of each word in the unstructured text.

In the present embodiment, the executing body may input the serialized text and the unstructured text alternately to the pre-trained language model, to learn the corresponding knowledge representations respectively.

When the serialized text is input, the pre-trained language model may read the serialized text based on the mask matrix and the hierarchical code corresponding to the serialized text, to perform learning to obtain the knowledge representation of each word in the serialized text. The mask matrix and the hierarchical code may control the pre-trained language model to represent a hierarchical structure in the sub-graph of the knowledge graph. Generally, reading the serialized text based on the mask matrix corresponding to the serialized text may realize the reading of the serialized text in the order in the sub-graph of the knowledge graph. In addition, when reading the serialized text, combined with the hierarchical code corresponding to the serialized text, structure information contained in the sub-graph of the knowledge graph can also be acquired.

Similarly, when the unstructured text is input, the pre-trained language model may read the unstructured text based on the mask matrix and the hierarchical code corresponding to the unstructured text, to perform learning to obtain the knowledge representation of each word in the unstructured text.

It can be seen from FIG. 3 that compared with the embodiment corresponding to FIG. 2, the flow 300 of the method for learning a knowledge representation in the present embodiment highlights the knowledge representation learning step. Therefore, in the solution described in the present embodiment, the serialized text is read based on the mask matrix and the hierarchical code corresponding to the serialized text, which not only realizes reading the serialized text in the order in the sub-graph of the knowledge graph, but also acquires the structure information contained in the sub-graph of the knowledge graph. In addition, when pre-training, the serialized text and the unstructured text are alternately input, so that the pre-trained language model can use both the serialized text and the unstructured text of the knowledge graph. While using the knowledge graph information, a lot of extra knowledge is also supplemented from massive unstructured texts, making full use of the information in the knowledge graph and the unstructured text.

Figure 4:
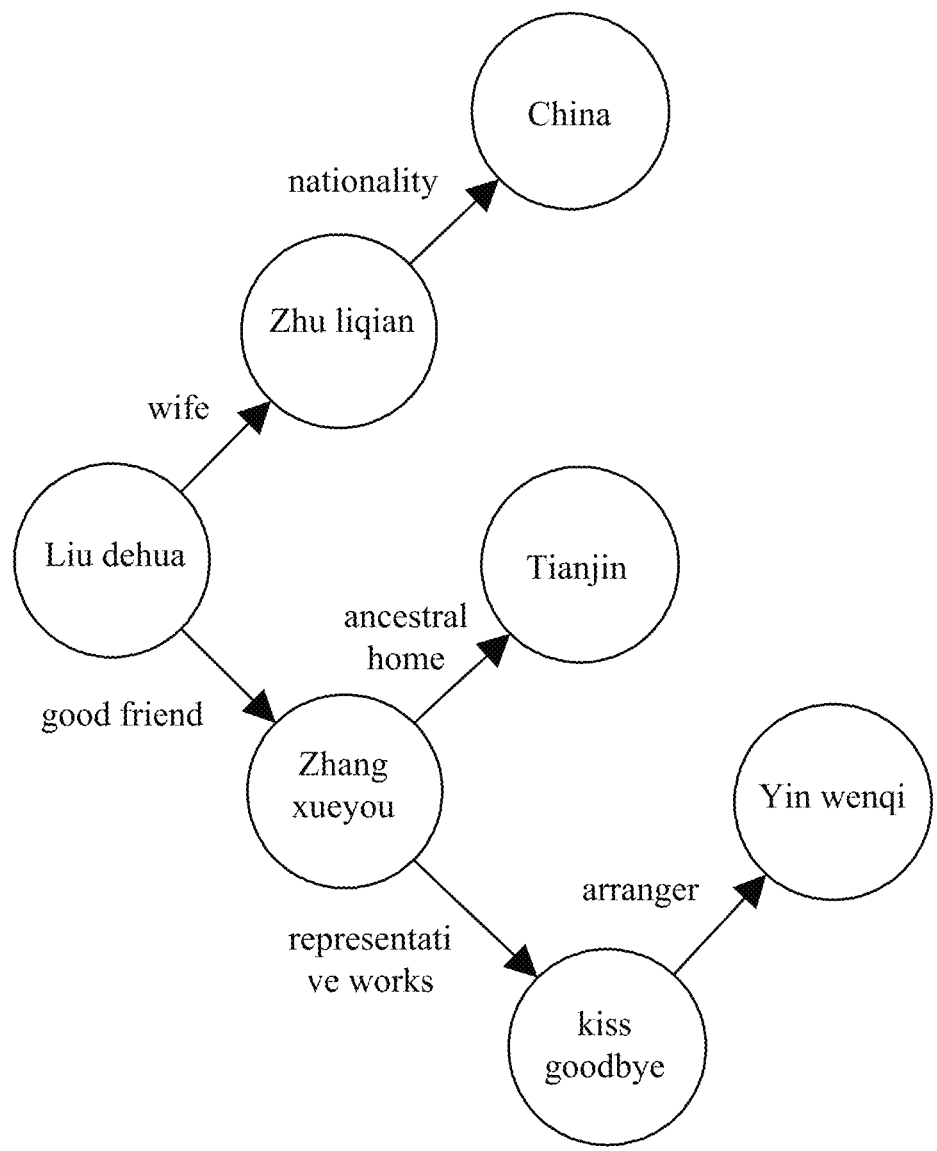
FIG. 4 is a schematic diagram of a sub-graph of a knowledge graph according to some embodiments of the present disclosure.
Figure 5:
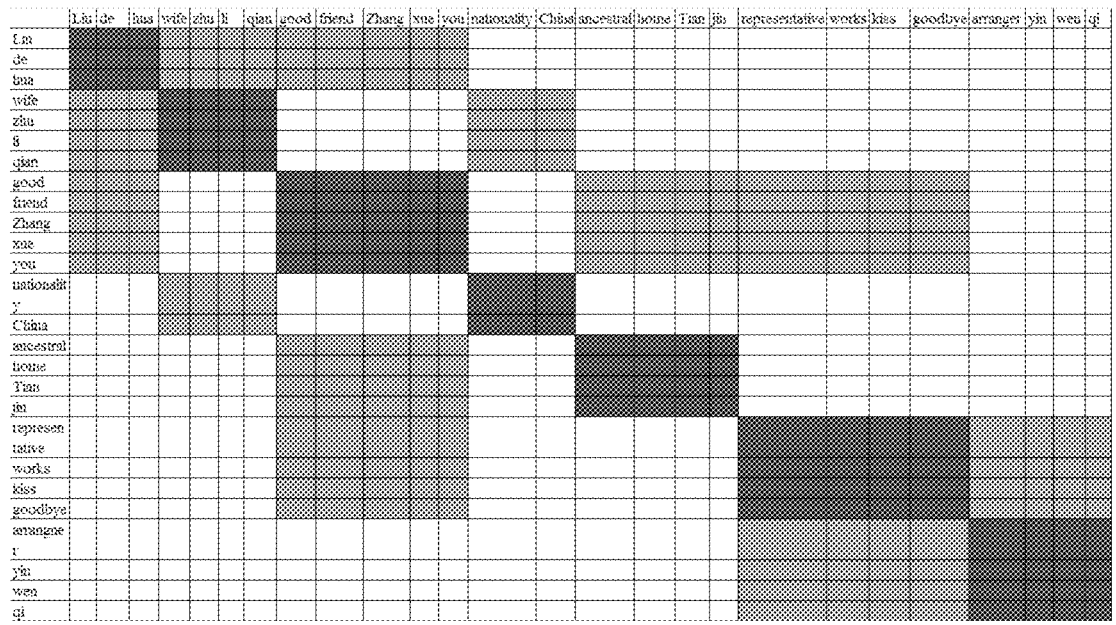
FIG. 5 is a schematic diagram of a mask matrix according to some embodiments of the present disclosure.

For ease of understanding, an application scenario that may implement the method for learning a knowledge representation of the embodiments of the present disclosure is provided as follows. As shown in FIG. 4, it shows a schematic diagram of a sub-graph of a knowledge graph. Specifically, a node representing the entity "Liu Dehua" is first sampled from a knowledge base; then a node representing the entity "Zhu Liqian" and a node representing the entity "Zhang Xueyou" are selected for the node representing the entity "Liu Dehua"; then walking continuously, a node representing the entity "China" is selected for the node representing the entity "Zhu Liqian", a node representing the entity "Tianjin" and a node representing the entity "kiss goodbye" are selected for the node representing the entity "Zhang Xueyou", and a node representing the entity "Yin Wenqi" is selected continuously for the node representing the entity "kiss goodbye"; and finally based on these entities and the relationship between these entities, the sub-graph of the knowledge graph may be generated. Breadth traversal is performed in the sub-graph of the knowledge graph in FIG. 4 to obtain the serialized text "Liu Dehua wife Zhu Liqian friend Zhang Xueyou nationality Chinese ancestral home Tianjin representative work kiss goodbye arranger Yin Wenqi". Because the semantics of the directly serialized text is not fluent on the whole, it is necessary to read in the order in the sub-graph of the knowledge graph in FIG. 4 to make the semantics fluent. As shown in FIG. 5, it shows a schematic diagram of a mask matrix. Specifically, each word in the serialized text may acquire an entity and a relationship corresponding to the word, and a parent node and a child node of the entity corresponding to the word. It can be seen that in the row corresponding to each word, the values of the elements corresponding to the entity and the relationship corresponding to the word, and the values of elements corresponding to the parent node and the child node of the entity corresponding to the word are all 1, and values of the remaining elements are all 0. In order to facilitate distinction, in the row corresponding to each word, the elements corresponding to the entity and the relationship corresponding to the word are represented in dark gray, the elements corresponding to the parent node and the child node of the entity corresponding to the word are represented in light gray, and the remaining elements are represented in white. For example, in the row corresponding to the word "Zhu" in the serialized text, the elements corresponding to the entity "Zhu Liqian" and the relationship "wife" corresponding to the word "Zhu" are represented in dark gray, the elements corresponding to the entity "Liu Dehua" represented by the parent node and the entity "Chinese" represented by the child node of the entity "Zhu Liqian" corresponding to the word "Zhu" and the relationship "nationality" are represented in light gray, and the remaining elements are represented in white. In addition, in order to express the structure information contained in the sub-graph of the knowledge graph in FIG. 4, a hierarchical code is added to the serialized text. Specifically, a corresponding digital code is assigned in sequence, according to the hierarchical order of words in the serialized text in the sub-graph of the knowledge graph. For example, the one word of relationship "wife" and the three words of the entity "Zhu Liqian" both have the hierarchical code 2. In this regard, when the serialized text is input, the pre-trained language model may read highly serialized text based on the mask matrix and the hierarchical code to acquire a series of short sentences composed of texts corresponding to head and tail node entities and relationship such as "Liu Dehua wife Zhu Liqian" and "Liu Dehua friend Zhang Xueyou", that is, the knowledge representation of each word in the serialized text may be obtained by learning.

Figure 6:
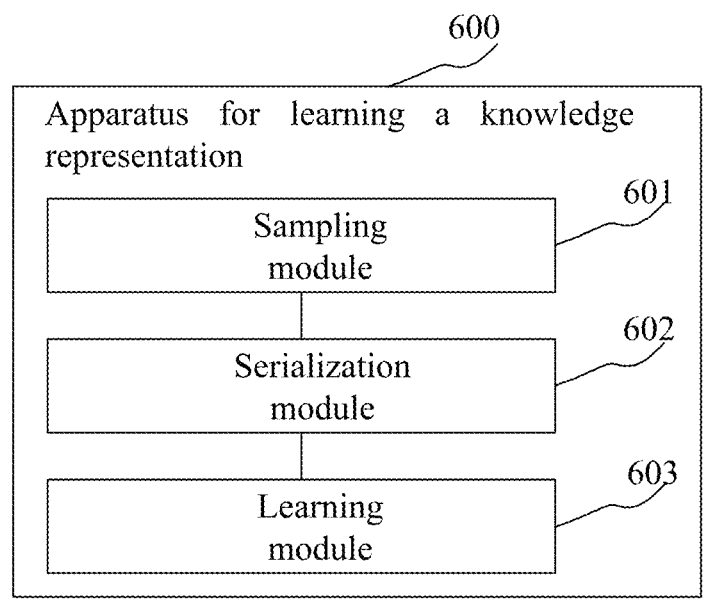
FIG. 6 is a schematic structural diagram of an embodiment of an apparatus for learning a knowledge representation according to some embodiments of the present disclosure.

With further reference to FIG. 6, as an implementation of the method shown in the above figures, the present disclosure provides an embodiment of an apparatus for learning a knowledge representation, and the apparatus embodiment corresponds to the method embodiment as shown in FIG. 2. The apparatus may be specifically applied to various electronic devices.

As shown in FIG. 6, an apparatus 600 for learning a knowledge representation of the present embodiment may include: a sampling module 601, a serialization module 602 and a learning module 603. The sampling module 601 is configured to sample a sub-graph of a knowledge graph from a knowledge base. The serialization module 602 is configured to serialize the sub-graph of the knowledge graph to obtain a serialized text. The learning module 603 is configured to read the serialized text using a pre-trained language model in an order in the sub-graph of the knowledge graph, to perform learning to obtain a knowledge representation of each word in the serialized text.

In the present embodiment, in the apparatus 600 for learning a knowledge representation, for the specific processing and the technical effects thereof of the sampling module 601, the serialization module 602, and the learning module 603, reference may be made to the relevant descriptions of steps 201-203 in the embodiment corresponding to FIG. 2, and detailed description thereof will be omitted.

In some alternative implementations of the present embodiment, the sampling module 601 is further configured to: sample a node from the knowledge base according to a preset sampling ratio; and select a child node using the node as a starting point according to a preset sampling probability, and walk continuously until reaching a preset sampling depth, to obtain the sub-graph of the knowledge graph.

In some alternative implementations of the present embodiment, the serialization module 602 is further configured to: perform a breadth traversal in the sub-graph of the knowledge graph to obtain the serialized text.

In some alternative implementations of the present embodiment, the learning module 603 includes: a generation submodule (not shown in the figure), configured to generate a mask matrix and a hierarchical code corresponding to the serialized text, based on the serialized text and the sub-graph of the knowledge graph; and a learning submodule (not shown in the figure), configured to input the serialized text into the pre-trained language model, read the serialized text using the pre-trained language model based on the mask matrix and the hierarchical code corresponding to the serialized text, to perform learning to obtain the knowledge representation of each word in the serialized text.

In some alternative implementations of the present embodiment, the generation submodule is further configured to: construct the mask matrix corresponding to the serialized text by only acquiring, for a word in the serialized text, an entity and a relationship corresponding to the word, and a parent node and a child node of the entity corresponding to the word; and generate the hierarchical code corresponding to the serialized text, based on a level of the entity and the relationship corresponding to each word in the serialized text, in the sub-graph of the knowledge graph.

In some alternative implementations of the present embodiment, the learning submodule is further configured to: acquire unstructured text; generate a mask matrix and a hierarchical code corresponding to the unstructured text, where the mask matrix corresponding to the unstructured text is an all-one matrix, and the hierarchical codes corresponding to the unstructured text are all zero; and input the serialized text and the unstructured text alternately to the pre-trained language model, read the serialized text using the pre-trained language model based on the mask matrix and the hierarchical code corresponding to the serialized text, to perform learning to obtain the knowledge representation of each word in the serialized text, and read the unstructured text using the pre-trained language model based on the mask matrix and the hierarchical code corresponding to the unstructured text, to perform learning to obtain a knowledge representation of each word in the unstructured text.

According to an embodiment of the present disclosure, the present disclosure further provides an electronic device and a readable storage medium.

Figure 7:
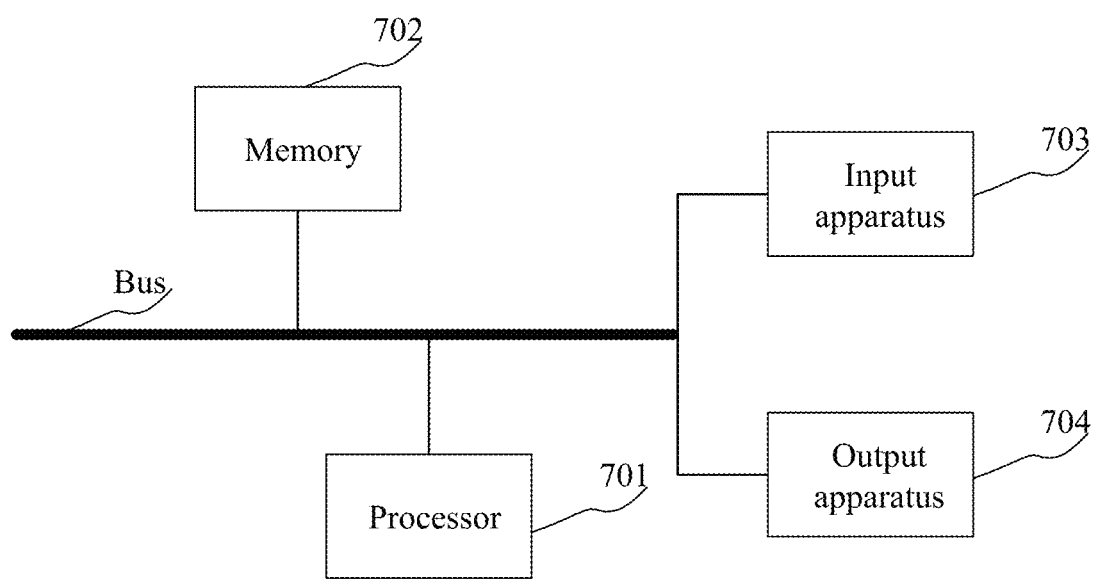
FIG. 7 is a block diagram of an electronic device adapted to implement the method for learning a knowledge representation according to some embodiments of the present disclosure.

FIG. 7 is a block diagram of an electronic device of the method for learning a knowledge representation according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile devices, such as personal digital processors, cellular phones, smart phones, wearable devices, and other similar computing devices. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be mounted on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 7, processor 701 is used as an example.

The memory 702 is a non-transitory computer readable storage medium provided by the present disclosure. The memory stores instructions executable by at least one processor, so that the at least one processor performs the method for learning a knowledge representation provided by the present disclosure. The non-transitory computer readable storage medium of the present disclosure stores computer instructions for causing a computer to perform the method for learning a knowledge representation provided by the present disclosure.

The memory 702, as a non-transitory computer readable storage medium, may be used to store non-transitory software programs, non-transitory computer executable programs and modules, such as program instructions/modules corresponding to the method for learning a knowledge representation in the embodiments of the present disclosure (for example, the sampling module 601, the serialization module 602 and the learning module 603 as shown in FIG. 6). The processor 701 executes the non-transitory software programs, instructions, and modules stored in the memory 702 to execute various functional applications and data processing of the server, that is, to implement the method for learning a knowledge representation in the foregoing method embodiments.

The memory 702 may include a storage program area and a storage data area, where the storage program area may store an operating system and at least one function required application program; and the storage data area may store data created by the use of the electronic device of the method for learning a knowledge representation. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely disposed with respect to the processor 701, and these remote memories may be connected to the electronic device of the method for learning a knowledge representation through a network. Examples of the above network include but are not limited to the Internet, intranet, local area network, mobile communication network, and combinations thereof.

The electronic device performing the method for learning a knowledge representation may further include: an input apparatus 703 and an output apparatus 704. The processor 701, the memory 702, the input apparatus 703, and the output apparatus 704 may be connected through a bus or in other methods. In FIG. 7, connection through the bus is used as an example.

The input apparatus 703 may receive input digital or character information, and generate key signal inputs related to user settings and function control of the electronic device of the method for learning a knowledge representation, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

According to the technical solution of the present disclosure, first samples the sub-graphs of the knowledge graph from the knowledge base; then serializes the sub-graphs of the knowledge graph to obtain the serialized text; and finally reads the serialized text using the pre-trained language model in the order in the sub-graphs of the knowledge graph, to perform learning to obtain the knowledge representation of each word in the serialized text. The knowledge representation learning is performed for entity and relationship representation in the knowledge base, which can efficiently calculate the semantic association of entities and relationships in a low-dimensional space, effectively solve the problem of data sparseness, and significantly improve the performance of knowledge acquisition, fusion and reasoning. In addition, using a powerful knowledge acquisition capability and context analysis capability of the pre-trained language model, the knowledge representation learned by the pre-trained language model may better represent complex relationships in the knowledge base.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for learning a knowledge representation, the method comprising:
    sampling a sub-graph of a knowledge graph from a knowledge base;
    serializing the sub-graph of the knowledge graph to obtain a serialized text; and
    reading, using a pre-trained language model, the serialized text in an order in the sub-graph of the knowledge graph, to perform learning to obtain a knowledge representation of each word in the serialized text by:
        generating a mask matrix and a hierarchical code corresponding to the serialized text, based on the serialized text and the sub-graph of the knowledge graph; and
        inputting the serialized text into the pre-trained language model, and reading the serialized text using the pre-trained language model based on the mask matrix and the hierarchical code corresponding to the serialized text, to perform learning to obtain the knowledge representation of each word in the serialized text.

2. The method according to claim 1, wherein the sampling a sub-graph of a knowledge graph from a knowledge base, comprises:
sampling a node from the knowledge base according to a preset sampling ratio; and
selecting a child node using the node as a starting point according to a preset sampling probability, and walking continuously until reaching a preset sampling depth, to obtain the sub-graph of the knowledge graph.

3. The method according to claim 1, wherein the serializing the sub-graph of the knowledge graph to obtain a serialized text, comprises:
performing a breadth traversal in the sub-graph of the knowledge graph to obtain the serialized text.

4. The method according to claim 1, wherein the generating a mask matrix and a hierarchical code corresponding to the serialized text, based on the serialized text and the sub-graph of the knowledge graph, comprises:
constructing the mask matrix corresponding to the serialized text by only acquiring, for a word in the serialized text, an entity and a relationship corresponding to the word, and a parent node and a child node of the entity corresponding to the word; and
generating the hierarchical code corresponding to the serialized text, based on a level of the entity and the relationship corresponding to each word in the serialized text, in the sub-graph of the knowledge graph.

5. The method according to claim 1, wherein the inputting the serialized text into the pre-trained language model, and reading the serialized text using the pre-trained language model based on the mask matrix and the hierarchical code corresponding to the serialized text, to perform learning to obtain the knowledge representation of each word in the serialized text, comprises:
acquiring unstructured text;
generating a mask matrix and a hierarchical code corresponding to the unstructured text, wherein the mask matrix corresponding to the unstructured text is an all-one matrix, and the hierarchical code corresponding to the unstructured text is an all-zero code; and
inputting the serialized text and the unstructured text alternately to the pre-trained language model, reading the serialized text using the pre-trained language model based on the mask matrix and the hierarchical code corresponding to the serialized text, to perform learning to obtain the knowledge representation of each word in the serialized text, and reading the unstructured text using the pre-trained language model based on the mask matrix and the hierarchical code corresponding to the unstructured text, to perform learning to obtain a knowledge representation of each word in the unstructured text.

6. An electronic device, comprising:
one or more processors; and
a storage apparatus, storing one or more programs,
wherein the one or more programs, when executed by the one or more processors, cause the one or more processors to perform operations, the operations comprising:
sampling a sub-graph of a knowledge graph from a knowledge base;
serializing the sub-graph of the knowledge graph to obtain a serialized text; and
reading, using a pre-trained language model, the serialized text in an order in the sub-graph of the knowledge graph, to perform learning to obtain a knowledge representation of each word in the serialized text by:

generating a mask matrix and a hierarchical code corresponding to the serialized text, based on the serialized text and the sub-graph of the knowledge graph; and
inputting the serialized text into the pre-trained language model, and reading the serialized text using the pre-trained language model based on the mask matrix and the hierarchical code corresponding to the serialized text, to perform learning to obtain the knowledge representation of each word in the serialized text.

7. The electronic device according to claim 6, wherein the sampling a sub-graph of a knowledge graph from a knowledge base, comprises:
sampling a node from the knowledge base according to a preset sampling ratio; and
selecting a child node using the node as a starting point according to a preset sampling probability, and walking continuously until reaching a preset sampling depth, to obtain the sub-graph of the knowledge graph.

8. The electronic device according to claim 6, wherein the serializing the sub-graph of the knowledge graph to obtain a serialized text, comprises:
performing a breadth traversal in the sub-graph of the knowledge graph to obtain the serialized text.

9. The electronic device according to claim 6, wherein the generating a mask matrix and a hierarchical code corresponding to the serialized text, based on the serialized text and the sub-graph of the knowledge graph, comprises:
constructing the mask matrix corresponding to the serialized text by only acquiring, for a word in the serialized text, an entity and a relationship corresponding to the word, and a parent node and a child node of the entity corresponding to the word; and
generating the hierarchical code corresponding to the serialized text, based on a level of the entity and the relationship corresponding to each word in the serialized text, in the sub-graph of the knowledge graph.

10. The electronic device according to claim 6, wherein the inputting the serialized text into the pre-trained language model, and reading the serialized text using the pre-trained language model based on the mask matrix and the hierarchical code corresponding to the serialized text, to perform learning to obtain the knowledge representation of each word in the serialized text, comprises:
acquiring unstructured text;
generating a mask matrix and a hierarchical code corresponding to the unstructured text, wherein the mask matrix corresponding to the unstructured text is an all-one matrix, and the hierarchical code corresponding to the unstructured text is an all-zero code; and
inputting the serialized text and the unstructured text alternately to the pre-trained language model, reading the serialized text using the pre-trained language model based on the mask matrix and the hierarchical code corresponding to the serialized text, to perform learning to obtain the knowledge representation of each word in the serialized text, and reading the unstructured text using the pre-trained language model based on the mask matrix and the hierarchical code corresponding to the unstructured text, to perform learning to obtain a knowledge representation of each word in the unstructured text.

11. A non-transitory computer readable medium, storing a computer program thereon, wherein the program, when executed by a processor, causes the processor to perform operations, the operations comprising:

sampling a sub-graph of a knowledge graph from a knowledge base;
serializing the sub-graph of the knowledge graph to obtain a serialized text; and
reading, using a pre-trained language model, the serialized text in an order in the sub-graph of the knowledge graph, to perform learning to obtain a knowledge representation of each word in the serialized text by:
generating a mask matrix and a hierarchical code corresponding to the serialized text, based on the serialized text and the sub-graph of the knowledge graph; and
inputting the serialized text into the pre-trained language model, and reading the serialized text using the pre-trained language model based on the mask matrix and the hierarchical code corresponding to the serialized text, to perform learning to obtain the knowledge representation of each word in the serialized text.

12. The computer readable medium according to claim 11, wherein the sampling a sub-graph of a knowledge graph from a knowledge base, comprises:
sampling a node from the knowledge base according to a preset sampling ratio; and
selecting a child node using the node as a starting point according to a preset sampling probability, and walking continuously until reaching a preset sampling depth, to obtain the sub-graph of the knowledge graph.

13. The computer readable medium according to claim 11, wherein the serializing the sub-graph of the knowledge graph to obtain a serialized text, comprises:
performing a breadth traversal in the sub-graph of the knowledge graph to obtain the serialized text.

14. The computer readable medium according to claim 11, wherein the generating a mask matrix and a hierarchical code corresponding to the serialized text, based on the serialized text and the sub-graph of the knowledge graph, comprises:

constructing the mask matrix corresponding to the serialized text by only acquiring, for a word in the serialized text, an entity and a relationship corresponding to the word, and a parent node and a child node of the entity corresponding to the word; and
generating the hierarchical code corresponding to the serialized text, based on a level of the entity and the relationship corresponding to each word in the serialized text, in the sub-graph of the knowledge graph.

15. The computer readable medium according to claim 11, wherein the inputting the serialized text into the pre-trained language model, and reading the serialized text using the pre-trained language model based on the mask matrix and the hierarchical code corresponding to the serialized text, to perform learning to obtain the knowledge representation of each word in the serialized text, comprises:
acquiring unstructured text;
generating a mask matrix and a hierarchical code corresponding to the unstructured text, wherein the mask matrix corresponding to the unstructured text is an all-one matrix, and the hierarchical code corresponding to the unstructured text is an all-zero code; and
inputting the serialized text and the unstructured text alternately to the pre-trained language model, reading the serialized text using the pre-trained language model based on the mask matrix and the hierarchical code corresponding to the serialized text, to perform learning to obtain the knowledge representation of each word in the serialized text, and reading the unstructured text using the pre-trained language model based on the mask matrix and the hierarchical code corresponding to the unstructured text, to perform learning to obtain a knowledge representation of each word in the unstructured text.

\* \* \* \* \*